United States Patent [19]

Kugler

[11] Patent Number: 4,916,628
[45] Date of Patent: Apr. 10, 1990

[54] MICROPROCESSOR-BASED CONTROL/STATUS MONITORING ARRANGEMENT

[75] Inventor: James G. Kugler, Glen Ellyn, Ill.

[73] Assignee: Commonwealth Edison Company, Chicago, Ill.

[21] Appl. No.: 216,882

[22] Filed: Jul. 8, 1988

[51] Int. Cl.[4] .......................... G01F 15/06; H02B 1/02
[52] U.S. Cl. .................................... 364/492; 364/550; 364/493; 307/11; 340/657
[58] Field of Search ........... 364/492, 493, 550, 551.01, 364/551.02, 518; 361/78, 79, 88, 93; 307/11, 36, 38, 39; 340/657–660, 664

[56] References Cited

U.S. PATENT DOCUMENTS

| | | | |
|---|---|---|---|
| 3,808,409 | 4/1974 | Enns et al. | 364/495 |
| 3,839,629 | 10/1974 | Russell | 364/495 |
| 3,842,249 | 10/1974 | Geyer et al. | 364/492 |
| 3,872,286 | 3/1975 | Putman | 364/493 |
| 3,932,735 | 1/1976 | Giras | 364/493 |
| 4,136,393 | 1/1979 | Fox | 364/492 |
| 4,153,936 | 5/1979 | Schmitz et al. | 364/493 |
| 4,181,950 | 1/1980 | Carter, II | 364/492 |
| 4,204,249 | 5/1980 | Dye et al. | 364/200 |
| 4,402,054 | 8/1983 | Osborne et al. | 364/551.01 |
| 4,489,385 | 12/1984 | Miller et al. | 364/493 |
| 4,513,382 | 4/1985 | Faulkner, Jr. | 364/492 |
| 4,517,468 | 5/1985 | Kemper et al. | 364/492 |
| 4,583,182 | 4/1986 | Breddan | 364/492 |
| 4,584,654 | 4/1986 | Crane | 364/550 |
| 4,620,283 | 10/1986 | Butt et al. | 364/493 |
| 4,644,479 | 2/1987 | Kemper et al. | 364/492 |
| 4,672,501 | 6/1987 | Bilac et al. | 364/492 |
| 4,718,025 | 1/1988 | Minor et al. | 364/518 |
| 4,742,445 | 5/1988 | Watanabe | 364/492 |
| 4,777,607 | 10/1988 | Maury et al. | 364/492 |

OTHER PUBLICATIONS

International Application No. PCT/US84—01570, filed 10/2/84, Applicant: American Telephone & Telegraph Company, New York, N.Y., Inventor: Joseph Abraham Breddan, entitled "Controllable Risk Parameter for Device Control system".

Article entitled "A Miniature Instrument & Control Switch for Power Industry Applications," from ELECTROSWITCH Technical Publication, MIN—1, effective Sep. 1, 1979, published by Electro Switch Corp., Weymouth, Mass. 02188.

Primary Examiner—Parshotam S. Lall
Assistant Examiner—Brian M. Mattson
Attorney, Agent, or Firm—Emrich & Dithmar

[57] ABSTRACT

A microprocessor-based control/status monitoring arrangement allows for replacement of mechanical memory, cam-operated control board switches, such as used in controlling and monitoring the operation of a conventional electrical power generating station. The control/status monitoring arrangement includes and operator input device, such as a keyboard or "touch screen" cathode ray tube (CRT), to permit operator entries, as well as a video display to provide visual information relating to the operating system, e.g., power generating station, being monitored and controlled. The control/status monitoring arrangement not only offers the advantages of the prior art cam-operated mechanical switches in a solid state system with programming flexibility, but also provides additional equipment status indications and controls, e.g., Lockout, Tripped, Auto Started, etc., and special interlocks to ensure operating safety. The present invention is adapted for integration with existing cam-operated mechanical switches and their replacement on a step-by-step basis and makes use of software timers to mimic the period an operator previously had to hold the prior art mechanical switches in a given position. The programmability of the control/status monitoring arrangement allows great flexibility in the manner in which status and control information is visually displayed.

12 Claims, 9 Drawing Sheets

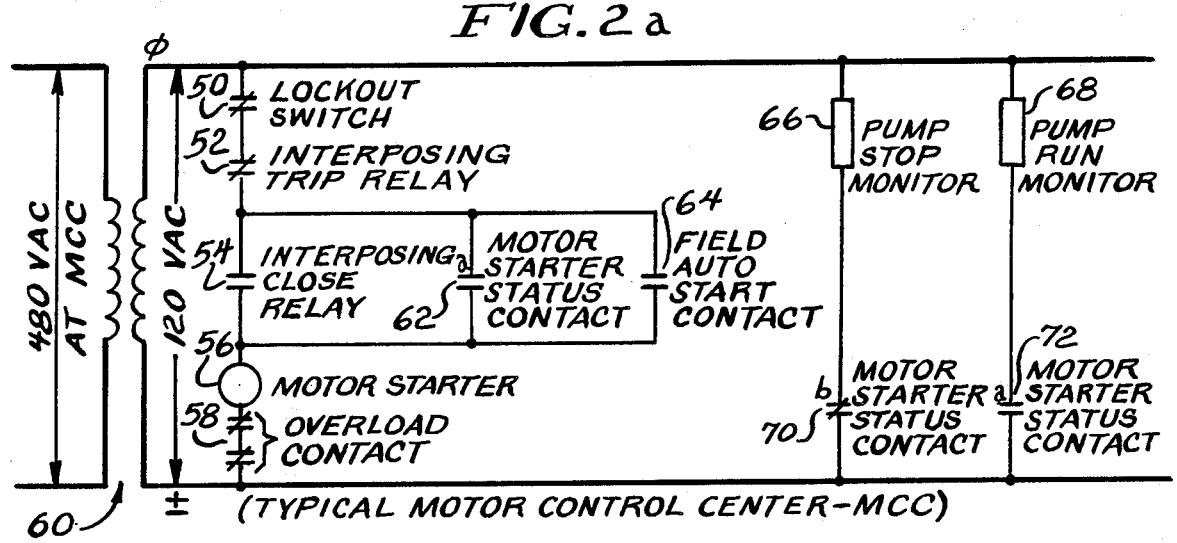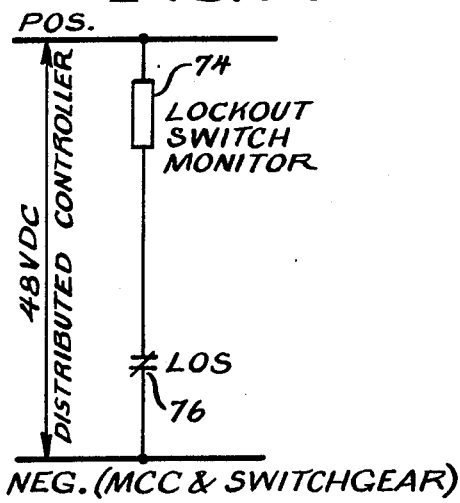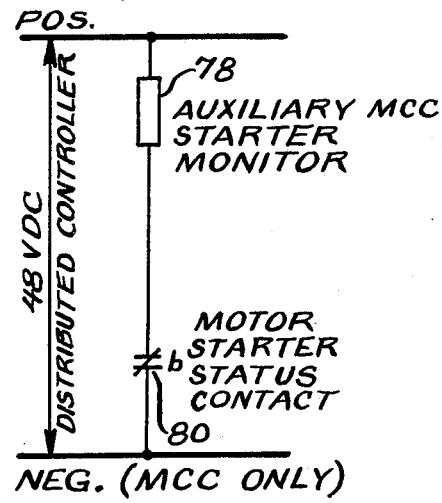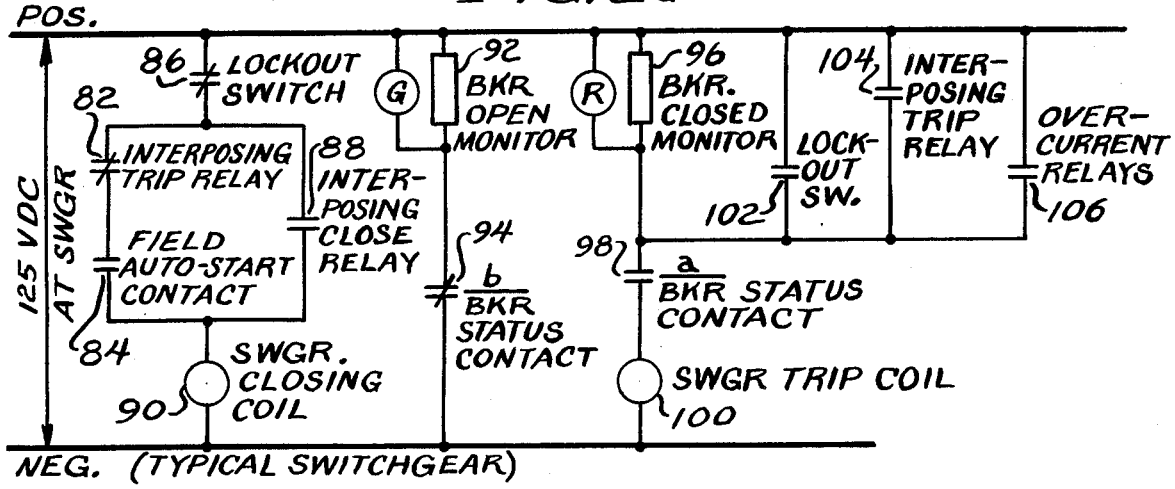

FIG. 9

SOFTWARE TRIP AND AUTO START ALARMS
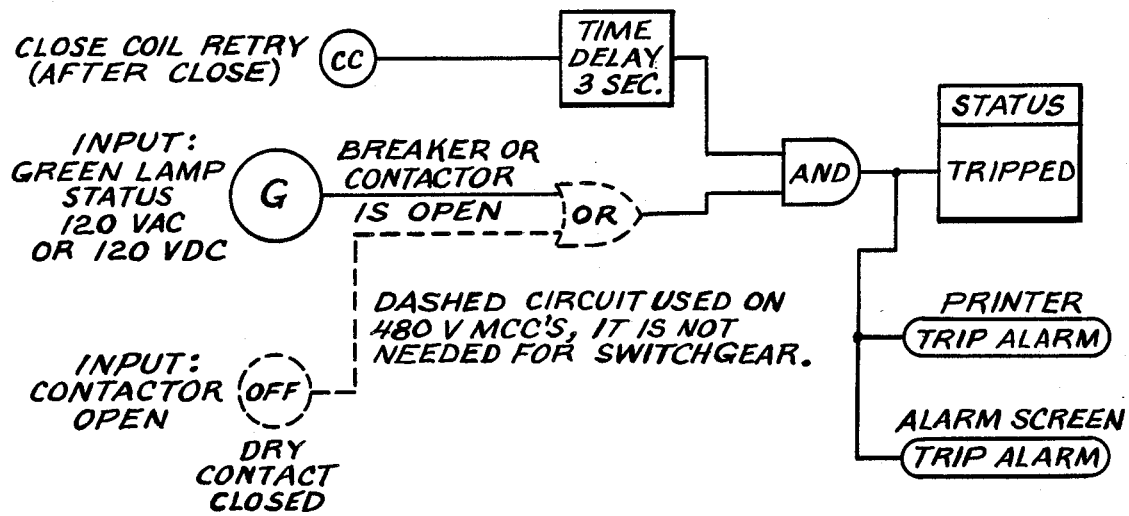
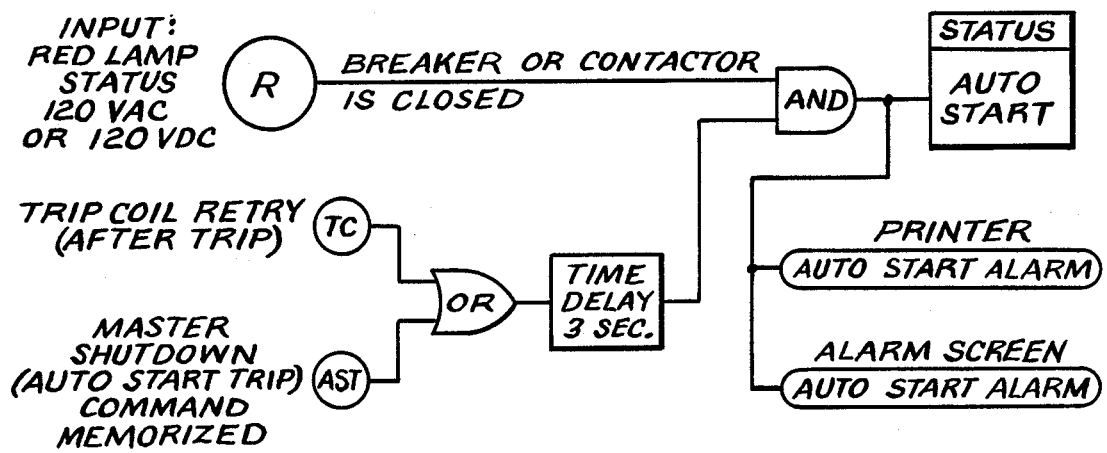
FIG. 11

MICROPROCESSOR-BASED CONTROL/STATUS MONITORING ARRANGEMENT

BACKGROUND OF THE INVENTION

This invention relates generally to the exercise of control over and status monitoring of an operating system and is particularly directed to a microprocessor-based control/status monitoring arrangement for displaying control inputs and system status in a conventional electric power generating station.

The operation of an electric power generating station must be continuously monitored from a safety and economic standpoint in order to ensure early detection of potential problems so that corrective action may be implemented and the potential problem avoided. A typical electric power generating station utilizes hundreds of sensors to obtain on-line indications of operating parameters and further includes hundreds of control devices, e.g., pumps, valves, etc., for regulating operation of the power station. The control room of the power generating station provides the operators with a multiplicity of visual displays and indicators as well as aural alarms for apprising the station operators of the station's operating condition. Controls readily accessible to the operators are available for various of the aforementioned devices in exercising control over the power station.

One example of an indicator/control switch commonly used in conventional power generating stations is the mechanical memory, cam-operated control board switch. These cam-operated switches typically include a plurality of integral indicating lights as well as a rotatable handle connected to a rotatable shaft having positioned therein along its length a plurality of contact combinations and notched cams. The contacts are spring-loaded closed and mechanically opened by cam action to avoid sticking. Rotational displacement of the handle and shaft permits the operator to select various control inputs. The switch also typically includes a pull-to-lock mechanism to permit the operator to lock the switch into a given position. The small light bulbs and colored mechanical indicator disk on the front panel of the switch provide the operator with alarm and indicator lights as well as a visual indication of what the last active position of the switch was. The contacts are closed when the switch is turned to its commanded position, with the slip cams enabling the handle to return to normal without disturbing the slip-contact decks. The slip-contacts will only open when the switch is turned to another control position.

Power station operators have experienced various problems with these mechanical memory, cam-operated switches. For example, if the switch's handle is held too long in a given position, there is a possibility of damaging some of the control equipment. On the other hand, if the rotary handle is not held by the operator long enough in a given position, the desired control function will not be initiated. In the past, station operators have determined the optimum time to maintain the handle in a given position by trial and error and have attempted to introduce some reliability in the switch actuation process by relying upon the individual operator's "feel" for a given switch. This imprecise procedure has led to less than optimum results in power station control. In addition, when new control or status monitoring instrumentation is added, additional control switches must be provided for in the control panel. This frequently results in installation problems because of the limited space available and the requirement to mount these switches on either six- or three-inch centers. The mechanical memory, cam-operated switches also offer limited reliability particularly in the required high frequency replacement of burned out indicator bulbs. Finally, the use of these indicator bulbs limits the amount of information which can be displayed for an operator.

The present invention is intended to overcome the aforementioned limitations of the prior art by providing a microprocessor-based control/status monitoring arrangement which makes use of a cathode ray tube (CRT) or other video display for presenting status information to an operator of an electric power generating plant and which also allows for the entry of control inputs in a user interactive manner. The control/status monitoring arrangement offers programmable flexibility to accommodate various combinations of sensors and control devices as well as to facilitate the incorporation of additional such devices without requiring additional space or electrical connections. While closely simulating the operation of prior art mechanical memory/cam operated control board switches, the present invention also offers the reliability of solid state electronics, the incorporation of additional status monitoring/control functions, and the flexibility of programming additional functions into the system, as well as establishing a hierarchy of selectable functions having various relative priorities.

OBJECTS AND SUMMARY OF THE INVENTION

Accordingly, it is an object of the present invention to provide an improved arrangement for monitoring the status and controlling the operation of an electric power generating station.

It is another object of the present invention to provide a control/status monitoring arrangement which affords the advantages of mechanical memory, cam-operated control board switches, but does not suffer from the limitations of such monitoring/control switches.

Yet another object of the present invention is to use software timers to simulate the "dwell time" an operator mechanically provides by holding a spring-return, multiposition switch in an "action position".

A further object of the present invention is to simplify and facilitate the incorporation of additional status monitoring/control switches in an electric power generating station.

A still further object of the present invention is to replace conventional mechanical memory, cam-operated control board switches, and their associated alarms, indicators and nameplates, with a CRT/keyboard-based, microprocessor controlled system which can be distributed throughout a plant such as an electric power generating station.

It is another object of the present invention to provide an electronic monitor/control switch which provides a visual indication of switch identity, current switch status, the last command entered via the switch, and permitted digital switch selections.

An additional object of the present invention is to provide a programmable switch arrangement having hierarchical logic which allows for ignoring lower priority commands while higher priority commands are still selected.

The present invention contemplates an arrangement for controlling and displaying the status of a plurality of remotely located devices in an operating system, which arrangement includes: first operator responsive means for designating one of the plurality of remotely located devices and for generating alphanumeric display, display control, and device control signals; visual display means coupled to the first operator responsive means and responsive to the alphanumeric display and display control signals for providing an alphanumeric visual display of the current status of as well as the last command provided to a designated remotely controlled device and for controlling the manner in which the current status and last command are presented; and signal processing means coupled to the first operator responsive means and to some of the remotely located devices for providing operator generated control signals thereto, wherein the control signals include a lockout signal for terminating the operation of a designated one of the remotely located devices.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIGS. 2a through 2d are simplified schematic diagrams of control circuit arrangements for controlling the operation of a device such as a pump for use with the present invention;

FIGS. 6-11 are logic diagrams illustrating the processing of various control and displayed status signals in accordance with the present invention.

DETAILED DESCRIPTION OF THE PREFERRED EMBODIMENT

Figure 1:
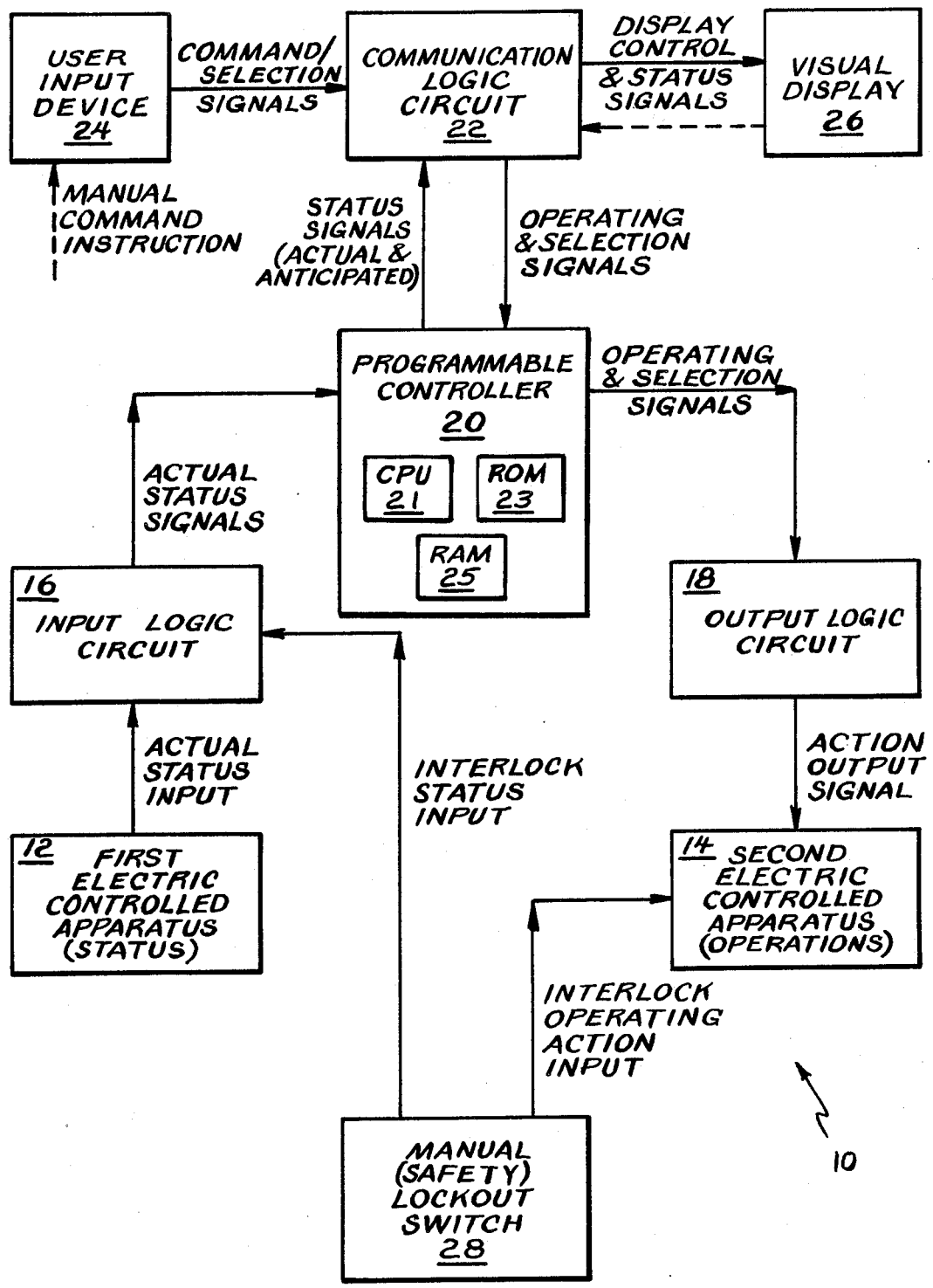
FIG. 1 is a simplified block diagram of a microprocessor-based control/status monitoring arrangement in accordance with the principles of the present invention.

Referring to FIG. 1, there is shown in block diagram form a microprocessor-based control/status monitoring arrangement 10 in accordance with the present invention.

The control/status monitoring arrangement 10 is intended to provide status monitoring of a first electric controlled apparatus 12, as well as to allow for the exercise of control over a second electric controlled apparatus 14. The control/status monitoring arrangement 10 also allows for simultaneous status monitoring of and the exercise of control over the same electric apparatus as described below. Although the control/status monitoring arrangement 10 of the present invention may be used for status monitoring and control of virtually any operating system, the present invention is particularly adapted for use in an electric power generating station. Thus, the types of electric apparatus contemplated for status monitoring and/or control in the present invention include electric motors, pumps, valves, transducers, level sensors, etc.

The control/status monitoring arrangement 10 further includes an input logic circuit 16 as well as an output logic circuit 18 respectively coupled between a programmable controller 20 and the first electric controlled apparatus 12 and the second electric controlled apparatus 14. The input logic circuit 16 is responsive to an analog or digital signal from the first electric controlled apparatus 12 representing its status, and converts this analog or digital signal to a digital communications signal which is provided to the programmable controller 20 for processing therein. As indicated above, the first electric controlled apparatus 12 may include virtually any type of sensing circuit such as a limit switch, relays, contactors, or pressure, level, temperature or flow switches, or analog signal transmitters, etc. The input logic circuit 16 or the first electric controlled apparatus 12 may include, or be coupled to, a voltage source which is not shown in FIG. 1 for simplicity. Current flowing in the first electric controlled apparatus 12 as a result of a voltage applied thereto is detected by the input logic circuit 16 and provided as a digital status signal to the programmable controller 20.

The programmable controller 20 also provides digital control signals to the second electric controlled apparatus 14 via the output logic circuit 18. The output logic circuit 18 converts the digital outputs from the programmable controller 20 to digital control signals for controlling the operation of the second electric controlled apparatus 14. The second electric controlled apparatus 14 may include a relay, contactor, a solenoid valve, a lamp, a motor starter circuit, etc.

A manual (safety) lockout switch 28 provides an interlock status input signal to the input logic circuit 16 as well as an interlock operating action input signal to the second electric controlled apparatus 14 in response to a user initiated input to the lockout switch. In the Lockout position, the manual lockout switch 28, which in a preferred embodiment is a multi-pole switch, continuously activates switchgear trip circuits, interrupts switchgear closing circuits, opens all motor control center (MCC) contactor circuits, and signals the programmable controller 20 to allow the reason for the shutdown to be displayed on a visual display 26. The manual lockout switch 28 is employed where an equipment circuit requires that solenoid valves be stopped or set to a fail-safe position. The manual lockout switch 28 is also used in motor circuits for devices such as conveyor belts, motor operated valves, fans, pumps, etc., which must be easily stopped, even where there is a failure in the electronic portion of the controlled apparatus. The manual lockout switch 28 serves to protect an operator where equipment is taken out of service for maintenance and ensures that electrical equipment such as MCC's and switchgear will not move or be energized, when disconnected by an operator.

The control/status monitoring arrangement 10 further includes a user input device 24 as well as the aforementioned visual display 26 which are coupled to the programmable controller 20 via a communication logic circuit 22. In a preferred embodiment of the present invention, the programmable controller 20, communication logic circuit 22, user input device 24, visual display 26, input logic circuit 16 and output logic circuit 18, form a combination known as the Westinghouse Distributed Processing Family (WDPF). This combination of components has been uniquely configured in the present invention to provide display and control functions not previously available. The user input device 24 is responsive to user initiated inputs and may be in the form of a keyboard, a joy stick, a track ball, or a touch-screen cathode ray tube (CRT).

The programmable controller 20 includes, among other components, a central processor unit (CPU) 21, a read only memory (ROM) 23, and a program random access memory (RAM) 25. The programmable controller 20 further includes an arithmetic-logic unit and a control section (not shown for simplicity) which, in combination, execute various operating instructions, control the flow of data, make decisions based upon system tests and the detection of various system parameters, temporarily store data, and perform logic and arithmetic functions. The ROM 23 is used to store a dedicated program in firmware form and numbers or constants which are needed during execution of the aforementioned program. The program RAM 25 is a read/write memory which stores data for use during program execution and from which data may be read by the CPU 21 for processing therein as the programmable controller 20 exercises control over the control/status monitoring arrangement 10.

Operating and selection signals which originate in the user input device 24 are provided to the programmable controller 20 via the communication logic circuit 22. These operating and selection signals are provided from the programmable controller 20 via the output logic circuit 18 to the second electric controlled apparatus 14. Status signals originating in the first electric controlled apparatus 12 and provided via the input logic circuit 16 to the programmable controller 20 are provided from the programmable controller to the communication logic circuit 22. The communication logic circuit 22 is coupled to and provides display control and status signals to the visual display 26 under the control of operator commands provided to the user input device 24. In one embodiment, the visual display 26 is a CRT, although the present invention is not limited to this type of display, but may include other display formats such as a gas plasma discharge display, a liquid crystal display (LCD), etc. The communication logic circuit 22 includes video display driver circuitry as well as logic circuitry for processing user commands from the user input device 24 as well as electric controlled apparatus status signals from the programmable controller 20 for presentation on the visual display 26. The present invention also contemplates a visual display 26 comprised of a touch sensitive CRT, where the user input device is integrated with the visual display and there is a bi-directional flow of signals between the communication logic circuit 22 and the visual display 26 as shown by the dotted line arrow in FIG. 1. A touch sensitive CRT allows the user to input manual command instructions by manually engaging selected portions of the CRT's faceplate.

Referring to FIGS. 2a through 2d, there are shown in simplified schematic diagram form, control circuit arrangements for controlling the operation of a device such as a pump for use with the present invention. Such control circuits are generally referred to as motor control centers (MCC's) and switchgear control circuits. The MCC circuit of FIG. 2a, which represents a typical control circuit for a pump, includes a transformer 60 for stepping down a 480 VAC line voltage to 120 VAC. A lockout switch 50 is coupled in series to an interposing trip relay 52, the parallel combination of an interposing close relay 54, a motor starter status contact 62, and a field auto start contact 64, and thence to a motor starter 56. The lockout switch 50 provides a safety shutdown capability. The motor starter 56 is used to initiate operation of the pump's motor. A pair of overload contacts 58 are coupled in series to the motor starter 56. The application of a user-initiated start command to the MCC circuit illustrated in FIG. 2a will close the interposing close relay 54 for a short period in order to initiate operation of the motor starter 56. The interposing close relay 54 provides a starter pulse to the motor starter 56 for thus initiating its operation. The motor starter status contact 62 then provides a continuous input to the motor starter 56 for sustaining operation of the motor. The field auto start contact 64 coupled in parallel with the interposing close relay 54 and the motor starter status contact 62 provides for auto start of the motor starter such as in response to a sensed input. A pump stop monitor 66 is coupled in series with the motor starter status contact 70, while a pump run monitor 68 is coupled in series to a motor starter status contact 72. The pump stop and run monitors 66, 68 are high voltage input sensors which detect when a contact is open or closed. The motor starter status contact 70 is open when the motor starter 56 is energized, while the motor starter status contact 72 is closed when the motor starter is energized.

All of the aforementioned interposing relays are of the double pole-double throw type. To limit controller power supply loading and heat generation in the output relay circuitry, most relays pulse, rather than remain pulled in. This action mimics the operating procedure of holding the old cam-operated switches in the Close or Trip position for a few seconds, and then releasing them. Software timers permit each relay's pulse period to be individually adjusted so that adequate command time is provided to produce the desired switchgear or MCC action (approximately 2 seconds). The various software timers are incorporated in the operating program stored in the programmable controller 20. The command time is limited so that defective equipment is not damaged, e.g., faulty reclosure prevention circuit. If Start is selected and nothing happens, the operator can select Start again without first selecting Stop and the interposing close relay 54 will pulse again. The interposing trip relay 52 is actuated by the programmable controller 20 both for Stop and Master Shutdown commands.

As shown in FIG. 2b, a lockout switch monitor 74 is coupled in series with the lockout switch (LOS) 76. As previously described, the manual lockout switch 76 is a multi-pole switch which, in the lockout position, continuously activates switchgear trip circuits, interrupts switchgear closing circuits, opens all MCC contactor circuits, and signals the programmable controller 20 so that logic circuitry therein can provide an indication on the visual display 26 to an operator of the reason for the shut down. When electrical equipment is to be shut down for maintenance or repair, the system operator normally selects Master Shutdown on the user input device 24, while a roving operator selects Lockout at a remote site where the equipment to be shut down or repaired is located. FIG. 2c illustrates that an auxiliary MCC starter monitor 78 is coupled in series with the motor starter status contact 80. With the motor starter status contact 80 closed, current will flow through the auxiliary MCC starter monitor 78 to provide the operator with an indication on the visual display 26 that the motor starter 56 is not in operation; this provides redundant auto-shutdown alarming ability in situations where no voltage exists to activate stop monitor 66.

FIG. 2d illustrates in simplified schematic and block diagram form a typical switchgear control arrangement operating at 125 VDC. Upon loss of 125 VDC, the switchgear remains in its last state (Open or Closed). In the switchgear arrangement of FIG. 2d, a lockout switch 86 is coupled in series with a switchgear closing coil 90. When the lockout switch 86 is open, the switchgear closing coil 90 cannot be activated. Coupled between the lockout switch 86 and the switchgear closing coil 90 is the serial arrangement of an interposing trip relay 82 and a field auto-start contact 84 coupled in parallel with an interposing close relay 88. The interposing close relay 88 applies a single short pulse and then releases to activate the switchgear closing coil 90. The field auto-start contact 84 provides for automatic start-up of the switchgear closing coil 90 upon the sensing of a pre-determined condition. The interposing trip relay 82 will remain open if Master Shutdown is selected, in order to prevent automatic activation of the switchgear closing coil 90 by the field auto-start contact 84. From FIG. 2d, it can be seen that the interposing trip relays 82, 104 both open the close circuit and energize the trip circuit. The switchgear arrangement of FIG. 2d also includes a breaker open monitor 92 coupled in series with a breaker status contact 94. The open monitor 92 will remain activated and provide an indication on the visual display 26 so long as 125 VDC control power is available, and the breaker is open. A switchgear mounted, green (G) lightbulb in parallel with the breaker open monitor 92, provides an indication of breaker status to equipment attendants. The parallel arrangement of a breaker closed monitor 96, a lockout switch 102, an interposing trip relay 104, and overcurrent relays 106 is coupled in series with a breaker status contact 98 and a switchgear trip coil 100. The closed monitor 96 will remain activated and provide an indication on the visual display 26 so long as 125 VDC control power is available and the breaker is closed and the trip coil has not burned open. A switchgear mounted, red (R) lightbulb in parallel with the breaker closed monitor 96, provides an indication of breaker status to equipment attendants. The overcurrent relays 106 close when the current is too large, causing the switchgear trip coil 100 to be actuated. The lockout switch 102 serves as a constant trip applied to the switchgear trip coil 100, while the interposing trip relay 104 closes for a short period and releases to actuate the switchgear trip coil or will remain closed if Master Shutdown is selected.

Figure 3A:
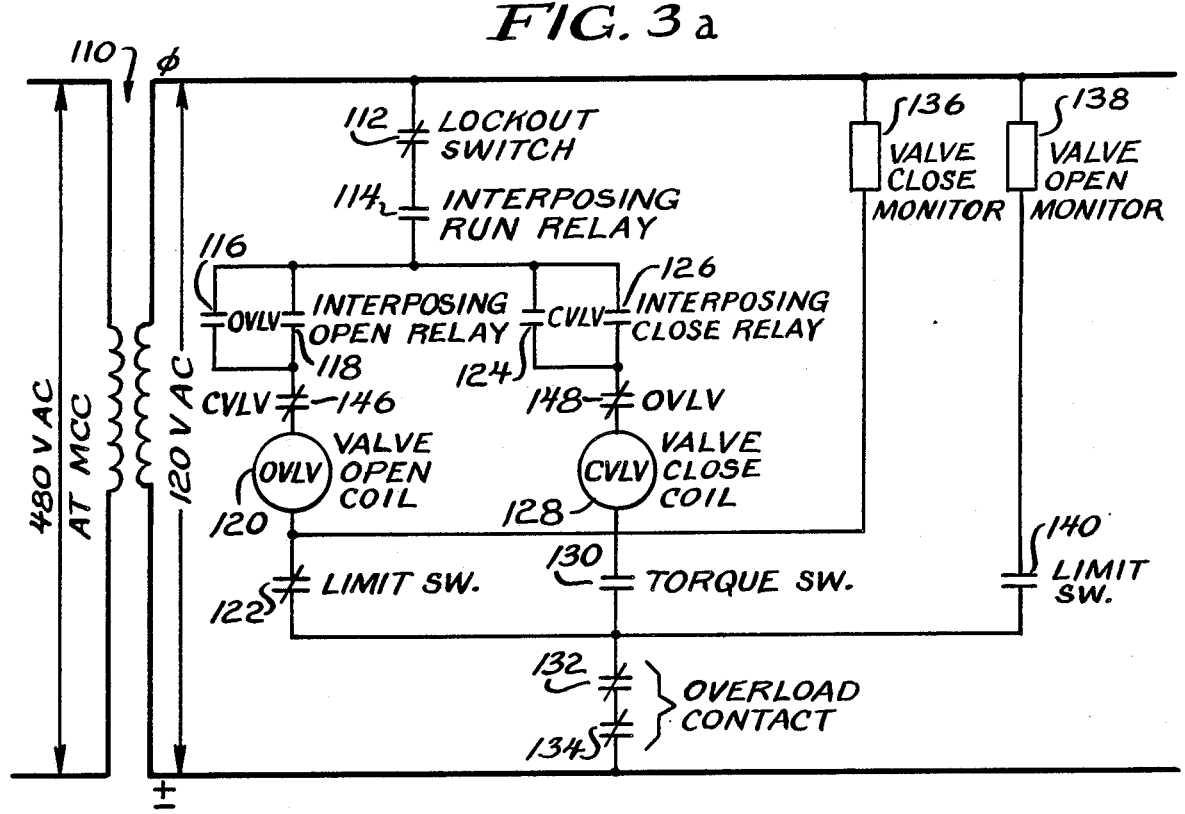
FIGS. 3a and 3b are simplified schematic diagrams of control circuits for controlling the operation of a device such as a valve for use with the present invention.
Figure 3B:
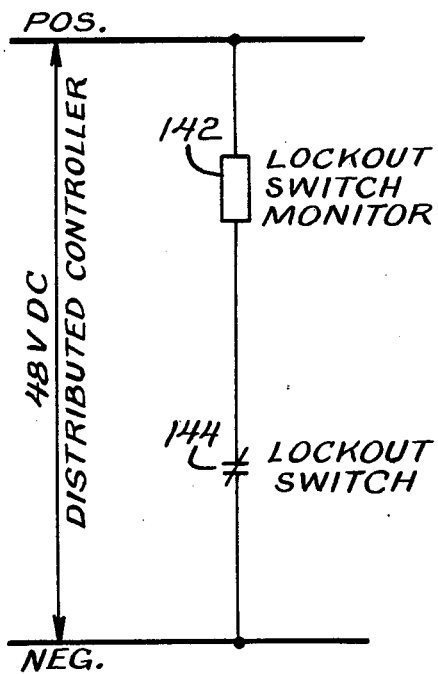

Referring to FIGS. 3a and 3b, there is shown one embodiment of a valve control arrangement with which the control/status monitoring arrangement of the present invention is intended for use. The valve control arrangement includes a stepdown transformer 110 for converting a 480 VAC input to 120 VAC. A lockout switch 112 is coupled in series with an interposing run relay 114 and thence to the parallel combination of valve open and valve closed circuitry. A pair of overload contacts 132, 134 are coupled in series with the valve closed and open circuitry. The valve open circuitry includes an open valve contactor 116 arranged in parallel with an interposing open relay 118, which combination is coupled in series with a close valve contactor (CVLV) 146, a valve open coil (OVLV) 120 and a limit switch 122. The valve closed circuitry includes the parallel combination of a close valve contactor (CVLV) 124 and an interposing close relay 126 coupled in series with an open valve contactor (OVLV) 148, a valve close coil 128 and a torque switch 130. A valve close monitor 136 is in series with limit switch 122 and the pair of overload contacts 132, 134; it is activated and provides an indication on the visual display 26 so long as 120 VAC control power is available and the overload contacts 132, 134 have not opened, and the valve is not fully open. A valve open monitor 138 is in series with limit switch 140 and the pair of overload contacts 132, 134; it is activated and provides an indication on the visual display 26 so long as 120 VAC control power is available and the overload contacts 132, 134 have not opened, and the valve is not fully closed. The open valve contact 116 and the close valve contact 124 remain pulled in until either the valve open limit switch 122 or the valve close torque switch 130 determines that its associated contactor is in the full open or full closed position, whereupon valve travel is terminated. The serial combination of a lockout switch monitor 142 and a lockout switch 144 is coupled across the 48 VDC source for monitoring the status of the lockout switch as shown in FIG. 3b.

When the lockout switch 112 is selected, the valve open and valve close coils 120 and 128 drop out and the system is de-activated. If STOP is activated, the interposing run relay 114 drops out and the valve can be stopped in mid-travel. The interposing open and close relays 118 and 126 are pulled in, in response to input pulses and initiate the opening or closing of the valve. The open and close valve contacts 116 and 124 provide for the respective lock in of valve open and valve close coils 120 and 128 until the valve is either fully open or fully closed. Valve travel continues until either the valve open limit switch 122 or the valve close torque switch 130 is actuated. The valve overload contacts 132 and 134 open when there is too much motor current, resulting in the tripping of either the valve open coil 120 or the valve close coil 128 to stop the valve motor. The torque switch 130 is closed during normal valve travel and opens when either the valve strikes an obstruction in the closing direction, or reaches the full closed position and torques down on its seat. Open and close valve contacts 148 and 146 prevent valve open and valve close coils 120 and 128 from energizing at the same time.

Figure 4:
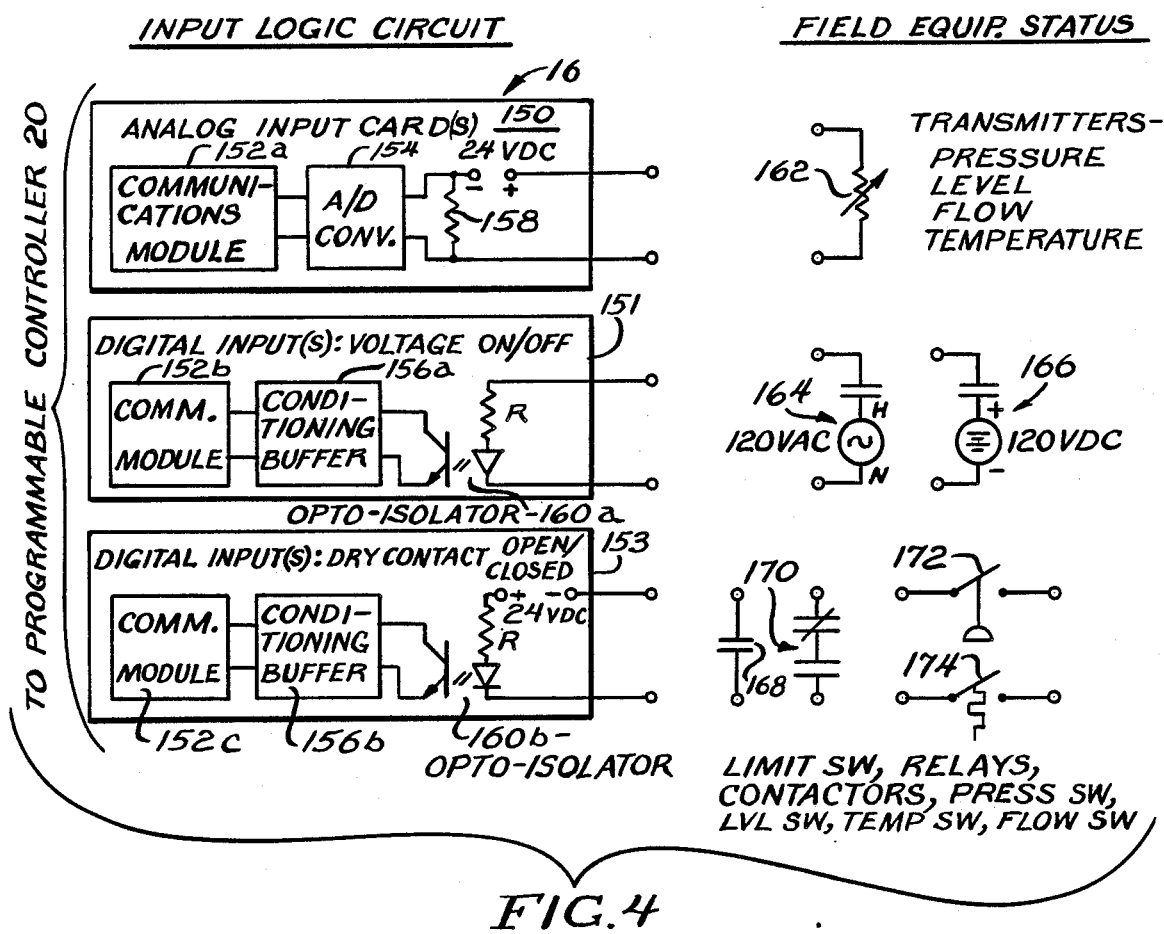
FIG. 4 is a combined block and schematic diagram of an input logic circuit for monitoring the status of various remote sensors and operating devices in the present invention.

Referring to FIG. 4, there s shown in combined block and schematic diagram form one embodiment of an input logic circuit 16 for use in the control/status monitoring arrangement of the present invention. The input logic circuit 16 includes a plurality of analog input cards 150, as well as a plurality of digital input voltage on/off cards 151 and digital input:dry contact open/closed cards 153. Coupled to each pair of contacts shown on the right hand portion of each of the aforementioned cards may be various remotely located electric controlled apparatus such as described below. The output of each of the cards 150, 151 and 153 is provided to the programmable controller 20 as described above. The use of each of the cards 150, 151 and 153 depends upon the type of remotely located, electric controlled apparatus being status monitored.

The analog input card 150 is intended for use with a variable resistance transducer 162 which may be responsive to pressure, a fluid level, flow, temperature, etc. A 24 VDC source is typically coupled to the variable resistance transducer 162, with the voltage across a second resistor 158 provided to an analog-to-digital converter 154 for converting the analog output of the variable resistance transducer to a digital signal. The output of the analog-to-digital converter 154 is provided to a communications module 152a which, in turn, provides a suitable digital signal to the programmable controller 20 for indicating the status of and identifying the variable resistance transducer 162. If so programmed, the controller 20 can start or stop equipment, or provide alarms in response to the magnitude of the analog input.

The digital input:voltage on/off card 151 is intended for use in monitoring the status of the combination of a contact and alternating voltage source 164 or a contact and a direct voltage source 166. If the contact is closed, current will flow through the resistor R as well as through the combination of a photodiode and phototransistor which form an opto-isolator 160a. The output of the opto-isolator 160a is provided to a conditioning buffer, or filter, circuit 156a and thence to a communications module 152b. The output of the communications module 152b is provided directly to the programmable controller 20 so as to provide an indication of the status and identity of the external voltage source and contact combination.

The digital input:dry contact open/closed card 153 includes its own source of 24 VDC and is intended for use in monitoring the status of a variety of remotely controlled devices such as a limit switch 168, the serial combination of a switch and relay 170, a flow switch 172 or a thermoswitch 174. The 24 VDC is applied across one of the aforementioned electrical controlled apparatus, or an equivalent thereof, and the current through an optoisolator 160b is provided to a conditioning buffer, or filter, circuit 156b. The output of the conditioning buffer 156b is provided via a communications module 152c to the programmable controller 20 in providing an indication of the status and identity of one of the aforementioned remotely located switches or sensors. Each of the aforementioned communications modules is adapted for providing a suitable signal to the programmable controller 20 which includes not only information as to the status of the remote electric controlled apparatus being monitored, but also the identity of this apparatus.

Figure 5:
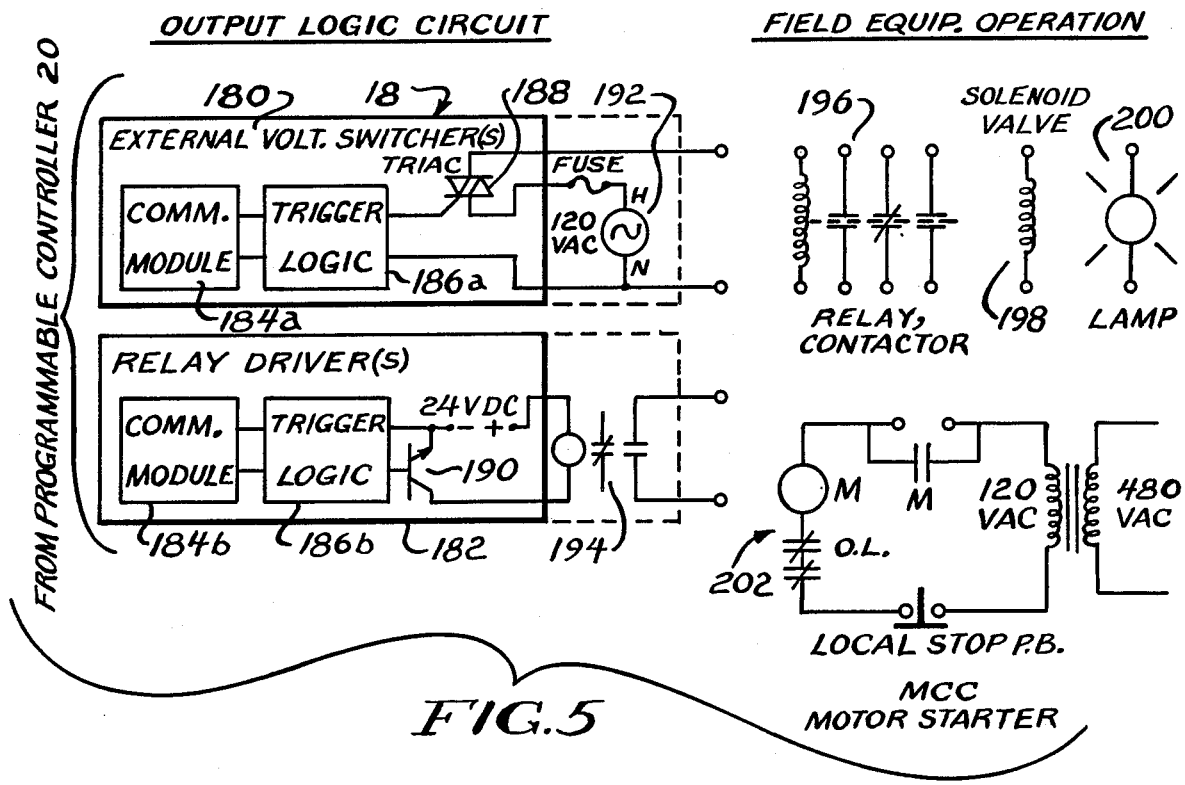
FIG. 5 is a combined schematic and block diagram of an output logic circuit for use in the present invention in controlling the operation of various devices.

Referring to FIG. 5, there is shown one embodiment of an output logic circuit 18 for use in the control/status monitoring arrangement of the present invention. The output logic circuit 18, as previously described, is coupled to the programmable controller 20 and receives digital operating and selection signals therefrom. These operating and selection signals are provided to either external voltage switcher 180 or relay driver 182, depending upon the type of electrical apparatus which is to be controlled. The external voltage switcher 180 includes a communications module 184a, a trigger logic circuit 186a, and a Triac 188 and is intended for controlling the operation of apparatus requiring an alternating voltage. For example, a 120 VAC source 192 feeding the output of the external voltage switcher 180 may be used to energize and control a relay, or contactor, 196, a solenoid valve 198, or a lamp 200. Similarly, the relay driver 182 includes a communications module 184b, trigger logic 186b, and a DC voltage source in combination with a switching transistor 190 for driving an external DC relay 194. The contact output of the relay 194 may be used to drive various electric controlled apparatus such as an MCC motor starter 202.

Also in accordance with the present invention, information regarding the operating status of and control inputs provided to the operating system are presented on the visual display 26 as shown in Tables I and II. Table I illustrates the information presented and the format of a typical pump status indication and memory display for use with the control circuits of FIGS. 2a-2d. Table II illustrates the information displayed as well as the graphic format for a valve status indication and memory display such as used for the control circuits of FIGS. 3a and 3b. As shown in Tables I and II, the video display includes a descriptive nameplate, or title, at the top, a plurality of status indications, a plurality of last command memory displays, and a numbered digital switch selection indicator at the bottom. A minimum width of eleven characters is used to display the various legends with little need for abbreviations. The nameplate, or title, portion of the display is comprised of three lines of eleven characters each. The background color was chosen as yellow (though other colors may be substituted) so that the switches could be stacked without confusing the lower white command buttons of an upper digital switch with the white nameplate of a lower digital switch. The middle of the digital switch display is the status indication section which consists of a maximum of five indicators, each of which can have a legend of up to eleven characters. If an indicator is on, or illuminated, it is provided with a colored background and black letters. If an indicator is off, it is provided with a black background with colored letters. By always keeping all legends visible, an operator is continually reminded which circuits are auto start types and what alarm conditions are constantly being monitored.

TABLE I
PUMP STATUS INDICATION AND MEMORY DISPLAY

| | TEXT | CONDITION | LETTER | BACKGROUND | BLINK |
|---|---|---|---|---|---|
| STATUS INDICATION | RUNNING | DEFAULT | RED | BLACK | NO |
| | RUNNING | (SWGR. BKR. CLOSED STATUS) = TRUE | BLACK | RED | NO |
| | TRIPPED | DEFAULT | YELLOW | BLACK | NO |
| | TRIPPED | (TRIP ALARM) = TRUE | BLACK | YELLOW | NO |
| | AUTO START | DEFAULT | RED | BLACK | NO |
| | AUTO START | (AUTO START ALARM) = TRUE | BLACK | RED | NO |
| | STOPPED | DEFAULT OR THREE SECONDS AFTER ENTERING SOLID BLUE LOCKOUT MODE | GREEN | BLACK | NO |
| | STOPPED | (STOPPED INDICATION) = TRUE AND (MASTER SHUTDOWN MEMORY) = RESET | BLACK | GREEN | NO |
| | STOPPED | (STOPPED INIDICATION) = TRUE AND (MASTER SHUTDOWN MEMORY) = SET | BLACK | GREEN | YES |
| | LOCKOUT | DEFAULT | CYAN | BLACK | NO |
| | LOCKOUT | SYSTEM IS IN SOLID BLUE LOCKOUT MODE | BLACK | CYAN | NO |
| | LOCKOUT | SWITCH IS IN LOCKOUT POSITION BUT SYSTEM NEVER RECEIVED STOPPED INDICATION | BLACK | CYAN | YES |
| LAST COMMAND MEMORY DISPLAY | START 1 | DEFAULT | BLACK | WHITE | NO |
| | START 2 | START COMMAND MEMORIZED | BLACK | RED | NO |
| | STOP 2 | DEFAULT | BLACK | WHITE | NO |
| | STOP 2 | STOP COMMAND MEMORIZED | BLACK | GREEN | NO |
| | MASTER SHUTDOWN 3 | DEFAULT | BLACK | WHITE | NO |
| | MASTER SHUTDOWN 3 | MASTER SHUTDOWN COMMAND MEMORIZED | BLACK | GREEN | NO |
| | LOCKOUT RESET 4 | DEFAULT | BLACK | WHITE | NO |
| | LOCKOUT RESET 4 | LOCKOUT MODE MEMORIZED AND LOCKOUT SWITCH RETURNED TO "NORMAL" POSITION (SYSTEM WILL COME OUT OF LOCKOUT MODE IF "LOCKOUT RESET" IS SELECTED) | BLACK | CYAN | YES |

NOTE A: BLACK LETTERS ON YELLOW BACKGROUND
NOTE B: "NORMAL" IS BLACK ON YELLOW "SELECTED" IS BLACK ON RED

TABLE II

VALVE STATUS INDICATION AND MEMORY DISPLAY

| | TEXT | CONDITION | LETTERS | BACKGROUND | BLINK |
|---|---|---|---|---|---|
| TITLE TITLE TITLE } NOTE A | | | | | |
| STATUS INDICATION { OPEN, CLOSED, LOCKOUT } | OPEN | DEFAULT | RED | BLACK | NO |
| | OPEN | (VALVE PARTIAL OR FULL OPEN) = TRUE | BLACK | RED | NO |
| | CLOSED | DEFAULT | GREEN | BLACK | NO |
| | CLOSED | (VALVE PARTIAL OR FULL CLOSED) = TRUE | BLACK | GREEN | NO |
| | LOCKOUT | DEFAULT | CYAN | BLACK | NO |
| | LOCKOUT | LOCKOUT SWITCH IS IN "LOCKOUT" POSITION | BLACK | CYAN | NO |
| LAST COMMAND MEMORY DISPLAY { OPEN 1, CLOSE 2, STOP 3, LOCKOUT RESET 4 } | OPEN 1 | DEFAULT | BLACK | WHITE | NO |
| | OPEN 1 | OPEN COMMAND MEMORIZED | BLACK | RED | NO |
| | CLOSE 2 | DEFAULT | BLACK | WHITE | NO |
| | CLOSE 2 | CLOSE COMMAND MEMORIZED | BLACK | GREEN | NO |
| | STOP 3 | DEFAULT | BLACK | WHITE | NO |
| | STOP 3 | STOP COMMAND MEMORIZED | BLACK | CYAN | NO |
| | LOCKOUT RESET 4 | DEFAULT | BLACK | WHITE | NO |
| | | LOCKOUT MODE MEMORIZED AND LOCKOUT SWITCH RETURNED TO "NORMAL" POSITION (SYSTEM WILL COME OUT OF LOCKOUT MODE IF "LOCKOUT RESET" IS SELECTED) | BLACK | CYAN | YES |
| [ ] } NOTE B | | | | | |

NOTE A BLACK LETTERS ON YELLOW BACKGROUND
NOTE B "NORMAL" IS BLACK ON YELLOW
"SELECTED" IS BLACK ON RED

The status indications shown in Table I for a pump include RUNNING, TRIPPED, AUTO START, STOPPED, and LOCKOUT. A lower portion of the digital switch display contains the last command memory display and the digital switch selection indicator. The four operator selectable commands shown in Table I are: START, STOP, MASTER SHUTDOWN and LOCKOUT RESET.

Before the operator can select a command, he must select the digital switch display associated with the remotely located sensor, or operating device, which the operator desires to control. With a "touch screen", the operator merely touches a selected portion of the CRT's faceplate. Where the visual display 26 is not of the "touch screen" type, and the user input device 24 is a multi-key keyboard, the operator in one embodiment, selects a key matching the character shown at the bottom of the digital switch video display (it is known as the digital switch selection indicator—it is "1" in Table I).

After the digital switch display has been selected, the operator is free to select a command shown in the last command memory display. The last permitted operator command is displayed with a colored background; the other displays have a white background. With a "touch screen", the operator merely touches one of the command memory displays to select it. Where the visual display 26 is not of the "touch screen" type and the user input device 24 is a multi-key keyboard, the operator in one embodiment selects programmable keys 1 through 4 to command one of the control actions illustrated in the lower portions of Tables I and II If the command is permitted by the logic within the programmable controller 20, the background of the digital switch indicator on the visual display 26 changes from white to another color, and the command is sent to the second electric controlled apparatus 14.

In the case of controlling the operation of a valve, there are also four commands which can be selected by an operator: OPEN, CLOSE, STOP, and LOCKOUT RESET, as shown in Table II. The numerical arrangement of the aforementioned status indications as well as control commands includes the grouping of associated status indications and commands to reduce the possibility of confusion during an emergency. The design provides individually adjustable timers in the software program stored in the programmable controller 20 to ensure that the various control switches are engaged sufficiently long to achieve proper equipment start, shutdown, repeat commands, as well as the avoidance of false alarms. RAM 25 within the programmable controller 20 also allows for a positive indication if a piece of equipment was shut off due to field "lockout switch" operation and also prevents unsafe control station operation until the operator resets the circuit.

In the status indication display portions of the indication and display presentations illustrated in Tables I and II, if a status indication is "true", it will be displayed as black characters on a color coded background. If a status indication is "false", it will be displayed as colored characters on a black background. The color of the characters can be the same color as the background was for the "true" state, or the color can be "muted" such as cyan or gray. The position of the characters on the display, such as RUNNING and STOPPED, never moves, but the colored background may be presented as green (or other base color) if the operator's last command should have made the status indicator "true", and red (or other base color) if the operator's last command should have made the status indicator "false". (This technique is referred to as "the green board concept"). Finally, the present invention contemplates the simultaneous presentation of a plurality of status indication and memory displays such as shown in the left hand portions of Tables I and II. These several presentations may appear on a CRT or other conventional visual display device and would provide status and control information for a plurality of remotely located devices such as sensors or control devices.

Referring to FIGS. 6 through 11, there are shown logic diagrams representing the manner in which signals are processed within the programmable controller 20 in carrying out the present invention. In FIGS. 6 through 11, the "AND, OR, MEMORY and NOT" symbols are standard. Large circles on the left side of each of these figures represent input module signals which are maintained as long as voltage is applied to an input point, or a contact is closed across an input point. Triangles on the left side of each of these figures represent short pulses from the command keys buffer or touch screen interface which would typically be in the communications logic circuit 22. Small circles enclosing a letter represent the continuation of a signal line. On-delay timers are represented by boxes which indicate the time an input signal must be present before the output will switch to a "1". The timers immediately reset upon loss of input signal. Hexagons represent output relay coil drivers. So long as a signal is applied to an output relay coil driver, the driver will apply voltage to a relay coil. A tapered oval with the words "Trip Alarm" or "Auto Start Alarm" is a software command that will send an alarm to the operator's visual display 26 or to a printer, if one is provided in the system. Boxes on the right side of each of the logic diagrams with the word "Status" or "Command" control color changes of the various status indicators and command indicators illustrated in Tables I and II.

Figure 6:
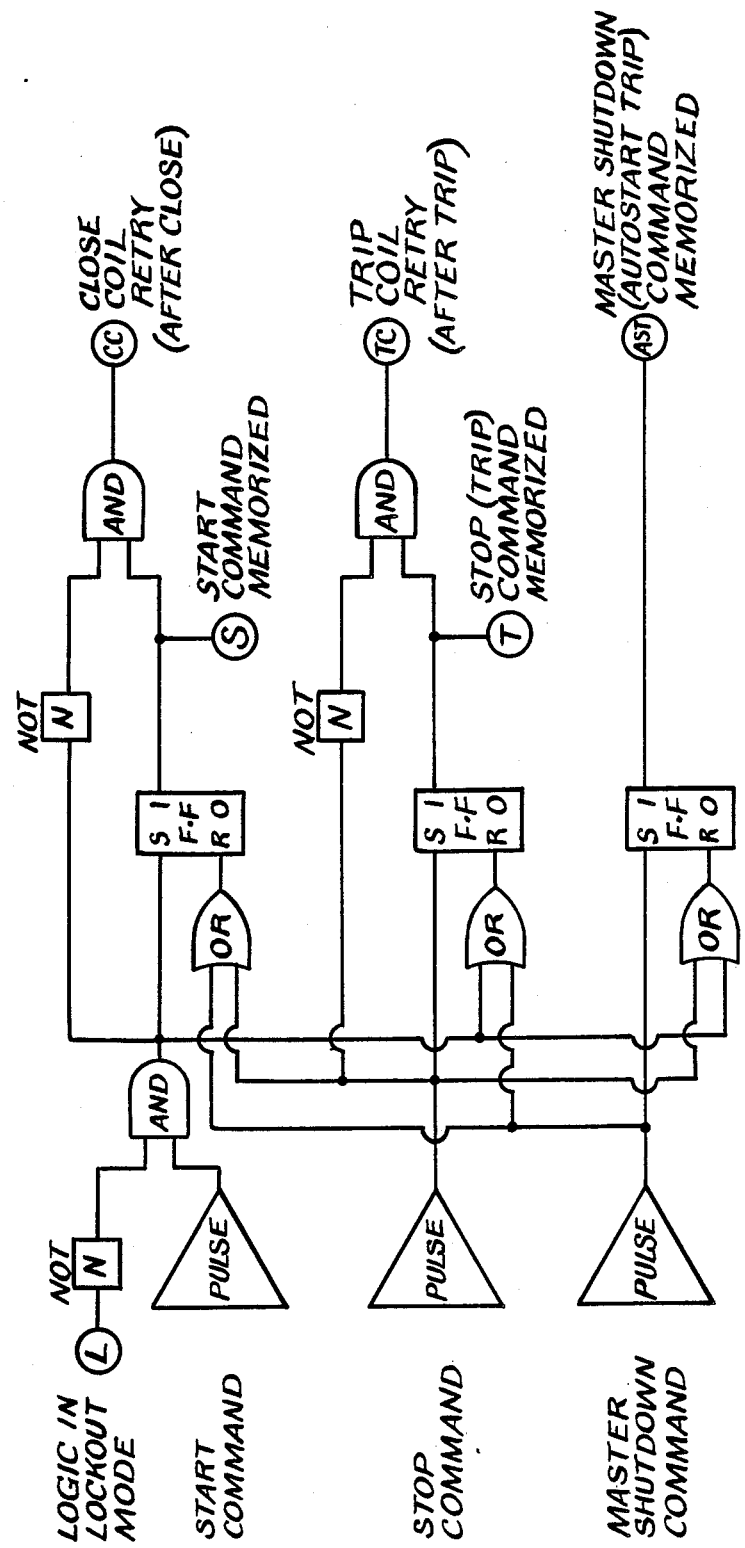
Figure 7:
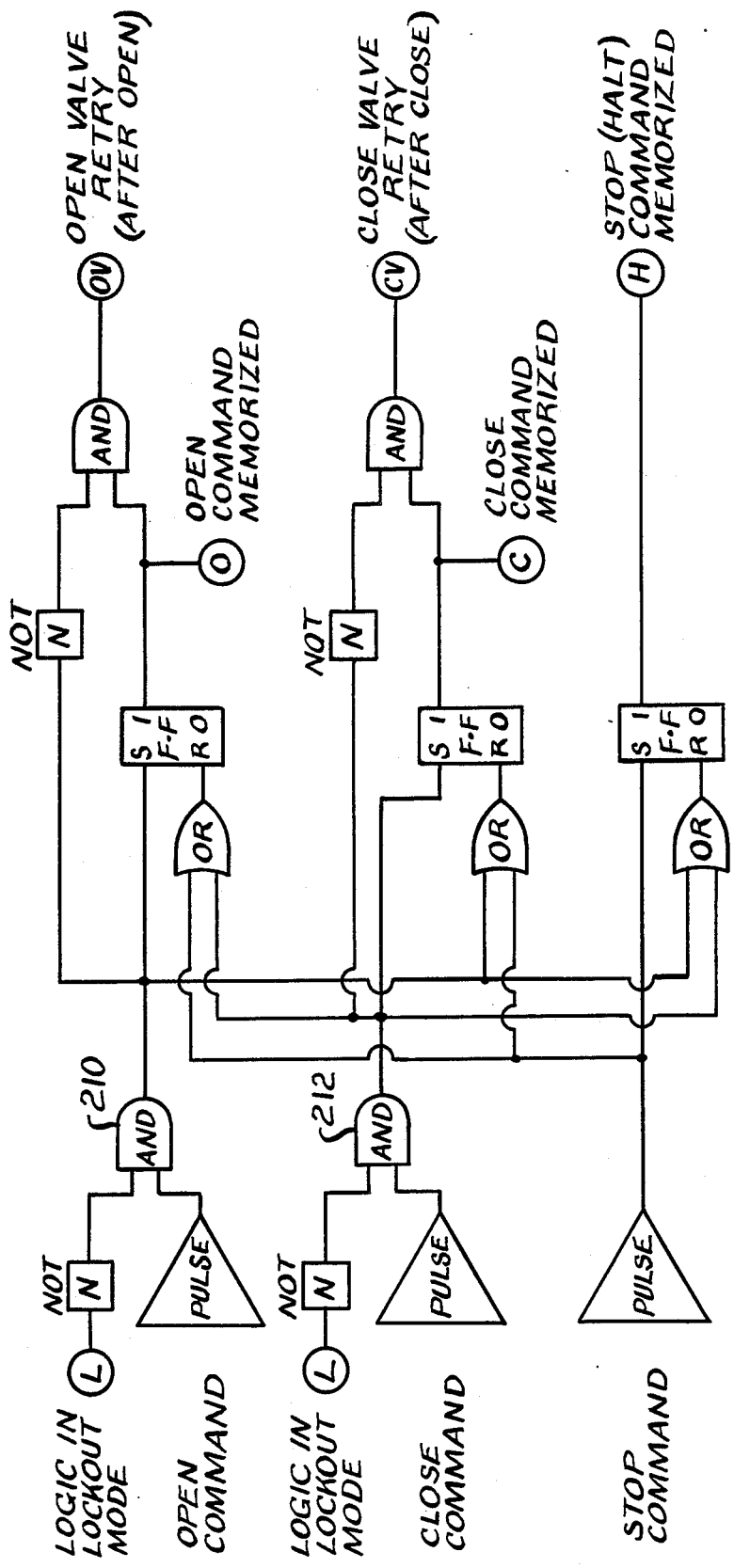

FIG. 6 provides an example of a pump interlock. Only Start is blocked by Lockout. The Stop and Master Shutdown commands are always permitted. FIG. 7 provides an example of a valve interlock. If the Lockout Switch is in the Lockout position, neither the Open nor Close command will go beyond AND gate 210 or AND gate 212, respectively, in programmable controller 20. It should be noted here that the Stop command is never blocked.

Figure 8:
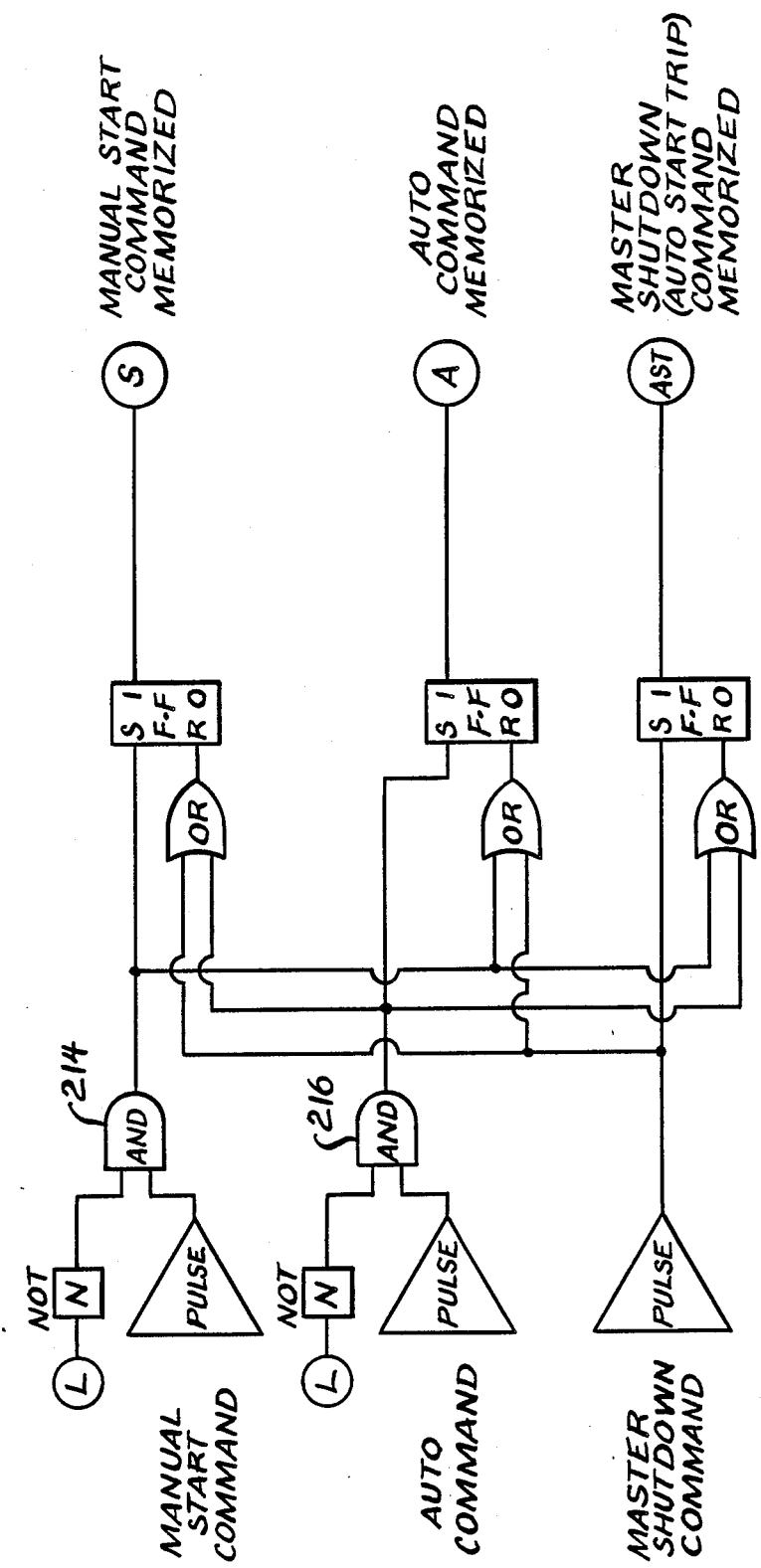

FIG. 8 provides another example of a pump interlock arrangement. If the Lockout Switch is in the Lockout position, neither the Manual Start nor Auto command will be transmitted past AND gates 214 and 216, respectively. As shown in FIG. 8, the Master Shutdown command is never blocked. Only the functions that Command the device to start or "permit" it to start are blocked by a Lockout.

Keyboard commands or touch screen commands are always buffered and presented as short pulses by operator interface logic within the communications logic circuit 22. The memory circuits latch during these short pulses and provide maintained command status for the rest of the logic circuits illustrated in FIGS. 6–11. The memory circuits delatch upon logic power loss. Output timers which provide pulsed signals to the interposing relay drivers must be momentarily reset if they are to send the same pulsed command again. FIGS. 6 and 7 illustrate the processing of "Close Coil Retry", "Trip Coil Retry", "Open Valve Retry", and "Close Valve Retry" logic. Once the Start command pulse is received, it sets the memory within the programmable controller 20 and makes "Close Coil Retry" a "1". If later, the Start command pulse is received again, "Close Coil Retry" will go to a "0" during the reception of the new Start command pulse, but as soon as that pulse is gone, the "Close Coil Retry" signal will return to a "1" status.

Figure 9:
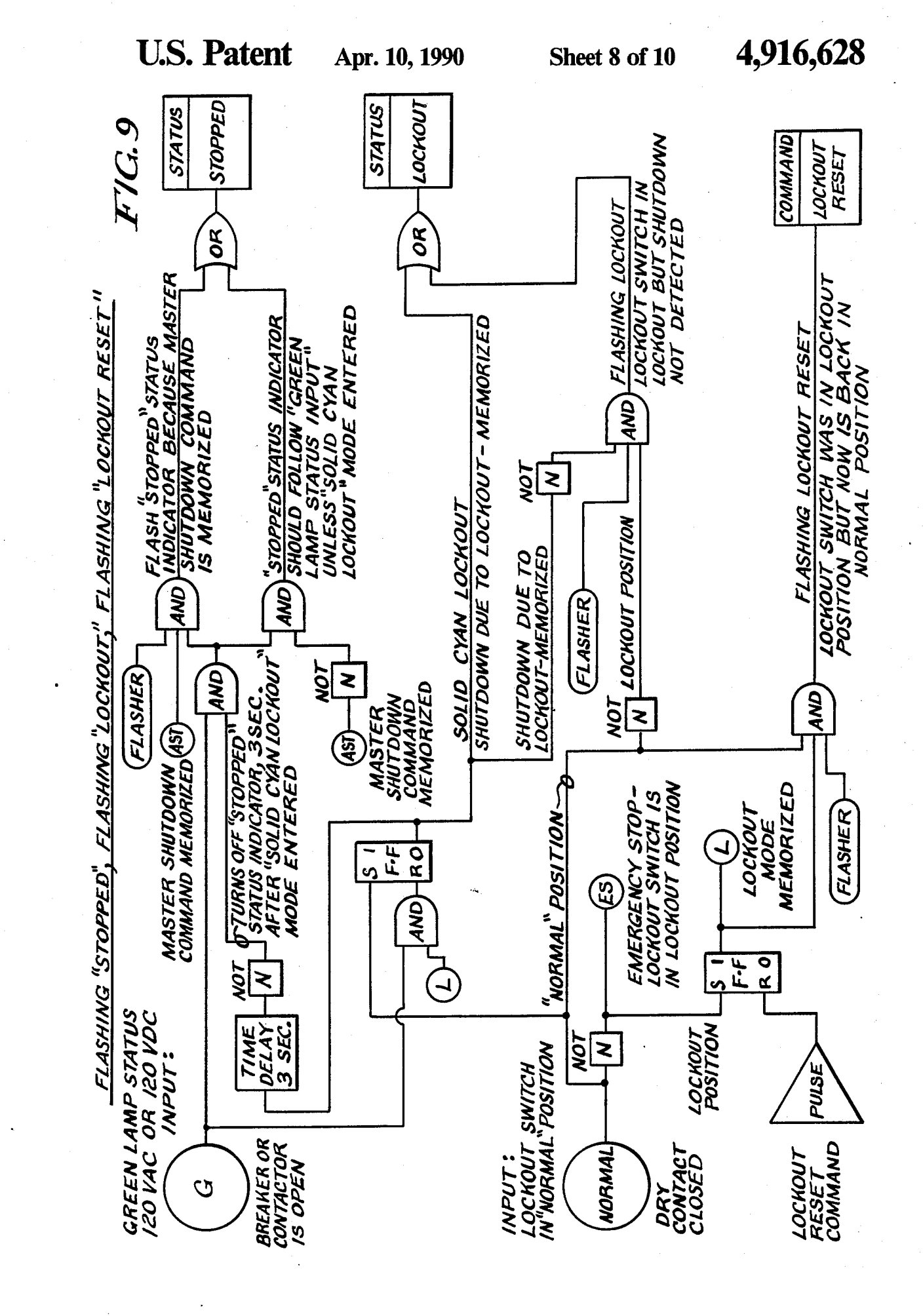
Figure 10:
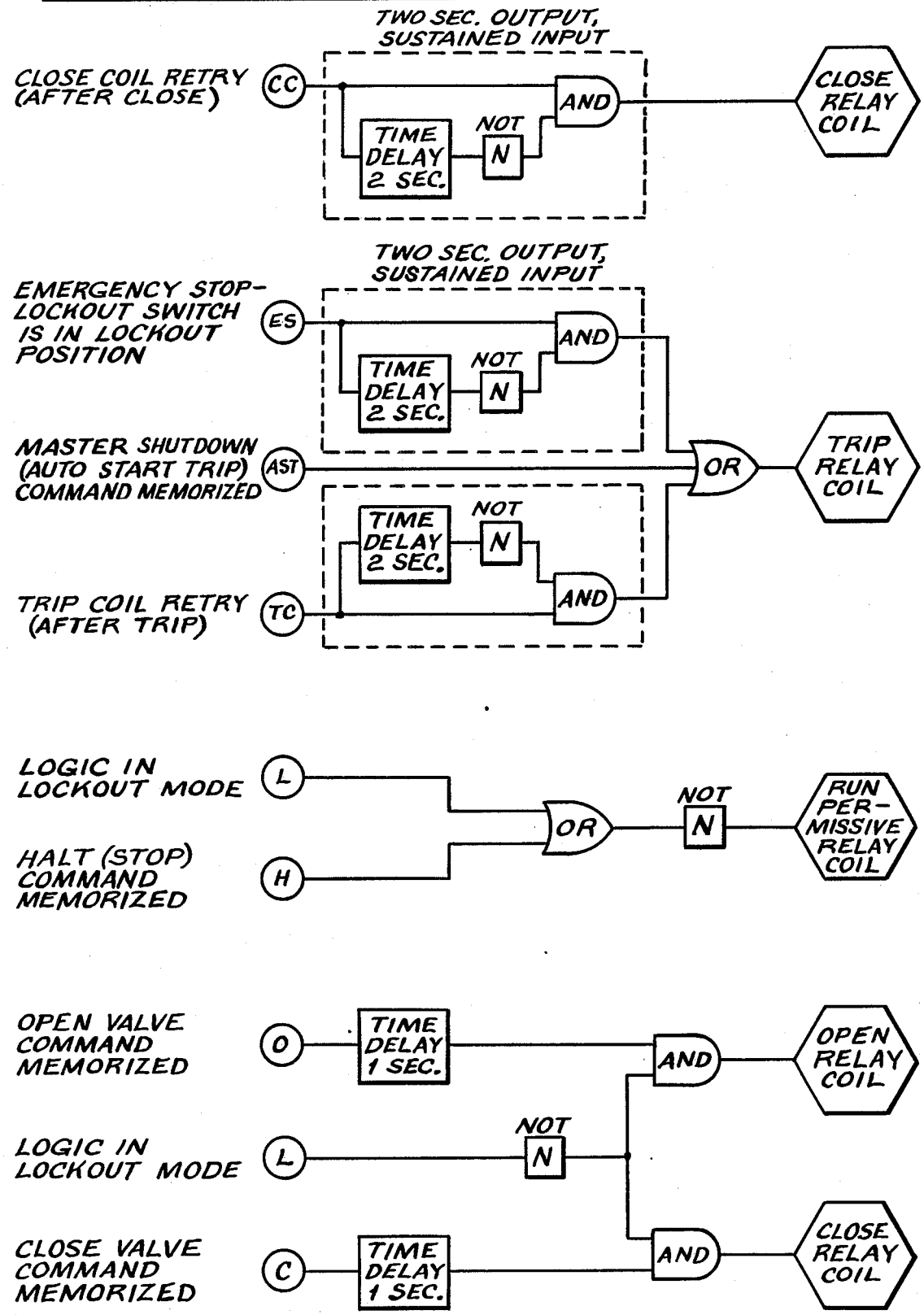

As shown in FIGS. 6, 8, and 10, the Master Shutdown Command prevents equipment from auto starting by constantly energizing the interposing Trip relay for switchgear and some motor control centers or by de-energizing the interposing Auto or Manual Start relays for other motor control centers and solenoid valves. The Lockout logic is designed to be failsafe. If the signal wires from the Lockout Switch break or if the input module is removed from the system, the logic of the present invention will take action as if the Lockout Switch were placed in the Lockout position such that feedback contact from the Lockout Switch to the various logic circuits opens for Lockout. Not only will Start, Open, and Close commands be interlocked out as shown in FIGS. 6, 7 and 8, but a signal termed "Emergency Stop" will be developed, which independent of the Lockout Switch, sends a pulse to shut down switchgear as shown in FIGS. 9 and 10. Note that if the pumps have an external autostart circuit, they will trip if signal wires between the Lockout Switch and input logic circuit 16 break, but the pumps will be permitted to restart (after the "emergency stop" pulse) as long as the Lockout Switch is actually not in the lockout position, and the external pressure or level switch requests that the pump run. FIG. 10 also shows that the Lockout logic will shut down all interposing Run permissive relays, as well as interposing "Valve Open" and "Valve Close" relays.

FIG. 9 illustrates the three flasher circuits which blink the visual display's Stopped and Lockout status indicators, as well as the Lockout Reset command key. All graphics interfaces offer a synchronized flash signal, so that all indications will blink in unison. When the Lockout Switch status contact is opened (Lockout position), the Lockout memory is latched. When the Lockout Switch is returned to the normal position, the command key's "Lockout Reset" background flashes between white and cyan. When the CRT console operator selects "Lockout Reset", the Lockout memory is reset and the command key returns to a solid white background. Since resetting the Lockout switch should be the last equipment operation of a roving operator when he is returning a pump or valve to service from an Out of Service condition, the flashing Lockout Reset tells the CRT console operator that the system is almost ready to go, and that he should be hearing from the roving operator soon. The flashing Lockout Reset is also a tattletale circuit such that if a vandal trips equipment by momentarily activating the Lockout Switch, the flashing "Lockout Reset" alerts the CRT console operator as to the source of the shutdown.

The Lockout and Stopped status indicators are somewhat more complicated, and they are interlocked. If the Lockout status indicator has a black background, the Lockout Switch is in the "Normal" position. If the Lockout status indicator has a steady, or a blinking cyan background, the Lockout Switch is in the "Lockout" position. Blinking "Lockout" means that for the period since the Lockout Switch was placed in the Lockout position, the device "Stopped" status was never detected. A steady cyan "Lockout" background (also called "SBL", "Solid Blue Lockout", or "Solid Cyan Lockout") means that the Lockout Switch is in the lockout position, and sometime since that action, the device "Stopped" status was detected (even though it may no longer be detected, i.e., the control fuses may now be pulled, and the breaker may be out of its cubicle). At least two situations can cause a flashing Lockout condition: First, using the Lockout Switch to try to shut off a piece of equipment with a burned open trip coil or open control fuses; and second, following improper out of service procedure by removing control fuses first, and then placing the lockout switch in the Lockout position.

If the Stopped status indicator has a solid green background, it means that the control circuit is powered and "device not running" is being received from the field contact. If the stopped status indicator has a blinking green background, all aspects of solid green status apply, but also included is the fact that the operating system is in the Master Shutdown mode (equivalent to Pull to Lock). This is to warn the operator that auto start circuits will not function for conditions such as low pressure or low level. Master Shutdown is also referred to in the figures as "AST" or "Auto Start Trip".

A Stopped indicator with a solid black background means the control fuses are removed, or "device not running" is not being received from the field, or the equipment has been in "Solid Blue Lockout" condition for over three seconds. Placing a mechanical memory, cam-operated control board switch in the "Pull to Lock" mode turns off the "Stopped" light. Now, "Solid Blue Lockout" will allow the operator to see the green "Stopped" indication for three seconds and then extinguish it. As soon as the Lockout Switch is returned to the "Normal" position, the Stopped status indicator shown in FIG. 9 is enabled and will blink, remain steady on, or be extinguished depending on field conditions.

The Solid Cyan Lockout memory (upper left in FIG. 9) operates upside down; placing the Lockout Switch in the "Normal" position sets the Solid Cyan Lockout memory. The memory is later reset by the combination of "device not running" detection, and the Lockout mode being latched into the lower left memory of FIG. 9 (requiring Lockout Reset to reset it). The inverted ("0") output is used from the Solid Cyan Lockout memory to affect control actions. This upside down logic was used because the set command always overrides the reset command, which allows the Lockout Switch position to override "Lockout Mode Memorized".

FIG. 11 shows the logic for "Tripped" and "Auto Start" alarms. This circuitry uses the voltage inputs which also operate the Running and Stopped status indicators. If no spare MCC or switch gear contacts were available in the past, this logic circuit provides alarms where none were possible. If the MCC and switchgear contacts were available to run annunciator points, those contacts can be spared for other purposes when the logic circuit shown in FIG. 11 is employed. In the case of MCC's, if the 480 VAC breaker trips, control power is lost as well as voltage inputs for field status. The dashed section of FIG. 11 represents the logic for an auxiliary dry contact from MCC's (if available). It can be a "b" contact as shown in FIG. 11, or an "a" contact with a "NOT" gate. This dry contact should only be used for the Tripped alarm and not the Stopped status indication since the Stopped status must be presented with a dark background upon a loss of control voltage.

Three seconds after an operator inputs a command to the present invention via the user input device 24, all alarm circuits will be armed. Any time thereafter that the field status does not match the command, an appropriate alarm will immediately be activated so as to provide an alarm status indication on the visual display 26, a paper printout, or an "alarm screen". Retry commands reset the alarm for three seconds and then rearm it. As an example, where the last command was Start and a pump has been running for two hours, a motor fault causes the switchgear to trip such that the Tripped alarm sounds immediately. If the operator selects Start again, the Tripped alarm will reset, the breaker will close and then immediately open, three seconds later the Tripped alarm will reactivate. If the operator desires to remove the tripped visual alarm status indication, he can select the Stop or Master Shutdown command.

The Auto Start alarm is armed three seconds after the Stop or Master Shutdown command is given. An Auto Start alarm received after sending a Master Shutdown command is especially serious since equipment in Master Shutdown mode should never Auto Start. The Auto Start alarm for the Stop command mode gives notice to the operator that equipment has started due to low pressure or low level. If the operator desires to remove the Auto Start visual alarm status indication, he can select the Start command.

FIG. 10 illustrates a logic circuit for activating relay drivers to provide pulse outputs for the interposing relays or to provide constant energization of interposing relays The pulses mimic an operator's hand on a spring return control switch where the operator holds the switch in the Start or Trip position for a few seconds and then releases it to the center position. The constant outputs mimic maintained position control switches. The relay logic is designed for fail safe operation. Upon power failure, all relays drop out, and all motor control center/switchgear equipment either stops or stays in its last state. To reduce power supply loading, relay energization is kept to a minimum. To avoid conflicting commands being sent at the same time and to allow valve motors to stop before reversing ("Valve Open" and "Valve Close"), one second time delay logic precedes the valve relay drivers. Switchgear and MCC's with seal-in logic only require a short contact closure to activate and will remain in that state even if the logic power fails. Though switchgear and contactors only require a few tenths of a second to activate, software timers are set longer to compensate for logic cycle time which can be near a full second for complex controllers or a fraction of a second for programmable controllers and interposing relay switching. Pulsed outputs are designed such that if the initiating signal is cancelled, the output pulse is immediately aborted in mid cycle.

The Westinghouse WDPF system, which forms a portion of the present invention in a preferred embodiment, works best with a 2 second pulse for switchgear and seal-in motor control centers, while 3 second pulses proved optimum for valves to ensure that they are moving. If an interposing relay has to mimic a pushbutton, it is provided with a 3 second pulse duration. Timer periods should not be extended too long, or equipment can be damaged. An "a" contact in series with the trip coil in switch gear is intended to protect the coil by interrupting current as soon as the breaker starts to open. If that "a" contact is defective, and remains closed, the trip coil will burn open if the logic of the present invention energizes the interposing trip relay too long.

As shown in the first circuit in FIG. 10, the switch gear Close command is always a pulse. The second circuit shows that the Stop command provides a trip pulse, the redundant Lockout Switch interlock provides a trip pulse (there is no need to keep the interposing Trip relay energized, the Lockout Switch will do the same function without using power), but the Master Shutdown command keeps the interposing trip relay activated. When energized, the interposing trip relay also opens the station battery feed to the switchgear close coil. The third circuit in FIG. 10 shows the interposing run permissive relay driver which is used to stop valves with seal-in circuits. If the relay driver drops out, the valve immediately halts. The last circuit shown in FIG. 10 is used on valve motor control centers without seal-ins. To guarantee that one interposing relay will drop out before the other pulls in, software logic provides a 1 second time delay to the relay drivers.

There has thus been shown an arrangement for controlling a plurality of remotely located devices in an operating system and for displaying the status as well as the last command provided to each of the remotely located devices. A system operator can not only exercise control over the remotely located devices, but can also exercise control over the manner in which the status and control signals are displayed for viewing by the operator. The arrangement of the present invention is intended to replace, and represents an improvement over, prior art electromechanical, multi-cam control switches and is particularly adapted for use in controlling the operation and monitoring the status of an electric power generating station. Timing functions carried out in these prior art cam-operated control switches are implemented with software timers in the microprocessor-based control/status monitoring arrangement of the present invention. One embodiment of the control/status monitoring arrangement provides alphanumeric character displays on a color CRT, wherein the status and operation of a plurality of remotely located devices may be displayed. The control/status monitoring arrangement provides great flexibility to accommodate increasing numbers of remotely located devices in the operating system, changing display characteristics based on human factors considerations, and the high reliability of digital electronics control.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. An arrangement for generating commands in controlling operation of and displaying status of a plurality of remotely located devices in an operating system, said arrangement comprising:

first operator responsive means for designating a plurality of remotely located devices and for generating display, display control and device control signals;

visual display means coupled to said first means and responsive to said display and display control signals for providing a visual display of the status of, as well as a last command provided to, each of said plurality of designated remotely located devices, to permit the status of said first operator responsive means to be determined by comparison of the visual display of the status of and the last command provided to a remotely located device, and for controlling a manner in which the status of and said last command provided to each of said plurality of designated remotely located devices are presented on said display means; and signal processing means coupled to said first means as well as to each of said plurality of remotely located devices for providing operator generated control signals to one or a plurality of designated remotely located devices in controlling the operation of said designated remotely located devices.

2. The arrangement of claim 1 wherein said visual display includes a presentation of alphanumeric characters and wherein said display control signals designate a color of the alphanumeric characteristic presented on said visual display means as well as a background color for the alphanumeric characters.

3. The arrangement of claim 2 wherein said visual display means further includes means for changing the color of the alphanumeric characters as well as the background color for the alphanumeric characters when the status of a designated remotely located device differs from an operator generated device control signal provided to said designated remotely located device.

4. The arrangement of claim 1 wherein said first operator responsive means comprises a multi-key keyboard and said visual display means comprises a color cathode ray tube.

5. The arrangement of claim 1 wherein said first operator responsive means and said visual display means comprise a user interactive, touch sensitive color cathode ray tube.

6. The arrangement of claim 1 wherein said plurality of remotely located devices include motor control centers and switchgear control circuits coupled to said signal processing means.

7. The arrangement of claim 1 wherein said operating system includes an electric power generating station and wherein said plurality of remotely located devices include motor control centers and switchgear control circuits coupled to said signal processing means.

8. The arrangement of claim 1 wherein said signal processing means includes timing means for controlling duration of said device control signals and ensuring operation of each of said plurality of designated remotely located devices in accordance with said operator generated control signals.

9. The arrangement of claim 8 wherein said signal processing means comprises a microprocessor having an operating program stored therein and wherein said timing means comprises a software timer.

10. The arrangement of claim 1 further comprising lockout switch means coupled to each of said plurality of remotely located devices for overriding all other device control signals and preventing the operation of a remotely located device.

11. The arrangement of claim 1 wherein said signal processing means includes memory means for storing a hierarchy of command defining permitted and nonpermitted commands for each of said plurality of remotely located devices, and for processing signals from said operator responsive means in accordance with said hierarchy of commands for displaying a last permitted command provided to a remotely located device.

12. The arrangement of claim 1 further comprising one or a plurality of voltage sources for energization and status monitoring of said plurality of remotely located devices, wherein said arrangement further comprises voltage monitoring means coupled to said one or a plurality of voltage sources and to said signal processing means for providing a status signal to said visual display means for display of the status of said one or a plurality of voltage sources thereon.

* * * * *

UNITED STATES PATENT AND TRADEMARK OFFICE
CERTIFICATE OF CORRECTION

PATENT NO. : 4,916,628

DATED : April 10, 1990

INVENTOR(S) : James G. Kugler

It is certified that error appears in the above-identified patent and that said Letters Patent is hereby corrected as shown below:

IN THE ABSTRACT:
  Title Page, under section entitled "Abstract",
  6th line: "and" should read --an--.

IN THE SPECIFICATION:
  Column 8, line 50: "there s shown" should read
  ---there is shown---.

Column 8, line 55: "input voltage" should read
  ---input:voltage---.

Column 15, line 32: Insert --. -- between "II"
  and "If".

Column 19, line 34: Insert --. -- between "relays"
  and "The".

IN THE CLAIMS:
  Claim 2, line 4: Replace the word "characteristic"
  with ---character---.

UNITED STATES PATENT AND TRADEMARK OFFICE
CERTIFICATE OF CORRECTION

PATENT NO.  : 4,916,628

DATED       : April 10, 1990

INVENTOR(S) : James G. Kugler

It is certified that error appears in the above-identified patent and that said Letters Patent is hereby corrected as shown below:

Claim 11, line 3:   Replace the word "command" with ---commands---.

Signed and Sealed this

First Day of October, 1991

*Attest:*

HARRY F. MANBECK, JR.

*Attesting Officer*  *Commissioner of Patents and Trademarks*